United States Patent
Prudvi et al.

(10) Patent No.: US 7,555,603 B1
(45) Date of Patent: Jun. 30, 2009

(54) TRANSACTION MANAGER AND CACHE FOR PROCESSING AGENT

(75) Inventors: Chinna Prudvi, Portland, OR (US); Derek T. Bachand, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 934 days.

(21) Appl. No.: 09/212,291

(22) Filed: Dec. 16, 1998

(51) Int. Cl.
*G06F 12/00* (2006.01)
*G06F 13/00* (2006.01)

(52) U.S. Cl. .................. 711/118; 711/100; 711/154

(58) Field of Classification Search .................. 711/113, 711/118, 144, 140, 141, 100, 119, 154
See application file for complete search history.

(56) References Cited

U.S. PATENT DOCUMENTS

| | | | |
|---|---|---|---|
| 4,884,197 A * | 11/1989 | Sachs et al. ..................... | 711/3 |
| 4,914,573 A * | 4/1990 | Scales, III et al. ........... | 711/144 |
| 5,155,824 A * | 10/1992 | Edenfield et al. ............ | 711/143 |
| 5,317,711 A * | 5/1994 | Bourekas et al. ............. | 714/47 |
| 5,611,058 A | 3/1997 | Moore et al. | |
| 5,642,494 A * | 6/1997 | Wang et al. .................. | 711/140 |
| 5,682,516 A * | 10/1997 | Sarangdhar et al. ......... | 711/146 |
| 5,696,910 A * | 12/1997 | Pawlowski ................... | 710/100 |
| 5,796,977 A * | 8/1998 | Sarangdhar et al. ............ | 709/1 |
| 5,903,738 A * | 5/1999 | Sarangdhar et al. ......... | 710/105 |
| 6,061,764 A * | 5/2000 | Chittor et al. ............... | 711/141 |
| 6,148,368 A * | 11/2000 | DeKoning ................... | 711/113 |
| 6,192,458 B1 * | 2/2001 | Arimilli et al. .............. | 711/220 |
| 6,195,730 B1 * | 2/2001 | West .......................... | 711/121 |
| 6,263,408 B1 * | 7/2001 | Anderson et al. ........... | 711/144 |
| 6,272,602 B1 * | 8/2001 | Singhal et al. .............. | 711/144 |
| 6,295,594 B1 * | 9/2001 | Meier .......................... | 711/171 |

OTHER PUBLICATIONS

The Cache Memory Book, Jim Handy; Academic Press, Inc; 1993.*
Pentium® Pro Family Developer's Manual, vol. 1: Specification, Chapters 1-7, pp. 1-1 to 7-3, Order No. 000900-001, Jan. 1996.

* cited by examiner

*Primary Examiner*—Tuan V. Thai

(57) ABSTRACT

A processing agent is used in a system that transfers data of a predetermined data line length during external transactions. The agent may include an internal cache having a plurality of cache entries. Each cache entry may store multiple data line lengths of data. The agent further may include a transaction queue system having queue entries that include a primary entry including an address portion and status portion, the status portion provided for a first external transaction of the agent, and a secondary entry including a status portion provided for a second external transaction.

15 Claims, 3 Drawing Sheets

TRANSACTION MANAGER AND CACHE FOR PROCESSING AGENT

BACKGROUND

The present invention relates to an improved cache and transaction queue system in a processing agent.

Modern computer systems may include multiple processing agents that communicate with one another over an external bus. An "agent" may include a general purpose processor, a digital signal processor an input/output or memory chipset, a bridge interface to other buses in the system or other integrated circuit that communicates over the external bus.

Typically, agents exchange data through bus transactions. An external bus protocol defines signals to be used by the agents to implement the bus transactions. For example, an external bus protocol for the known Pentium® Pro processor, commercially available from Intel Corporation, defines a pipelined bus protocol in which a transaction progresses through as many as six phases. The phases include: an Arbitration phase, a Request phase, an Error phase, a Snoop phase, a Response phase and a Data phase. Data may be transferred between agents in the Data phase. According to the Pentium® Pro bus protocol, up to 32 bytes of data may be transferred in a single bus transaction. Accordingly, an external memory in a computer system built around the Pentium® Pro bus protocol typically is organized into "data lines" having a 32 byte length. Other systems may operate according to other bus protocols and thereby define data lines of other lengths.

Agents typically include internal caches for storage of data. The internal cache operates at a higher clock rate than the external bus and, therefore, provides faster access to data than external memory. Known internal caches are populated by cache entries having the same length as the data lines of external memory. Thus, an internal cache in the Pentium® Pro processor possesses cache entries having 32 byte lengths. Again, cache entries of other systems may have different cache line lengths than the Pentium® Pro processor to match different data line lengths of their respective systems. However, in all known systems, the length of cache lines are the same as the length of the data lines.

Internal caches store not only data from external memory but also store administrative data related to the data from external memory. For example, the caches associate data with their external addresses. They may also store state information related to cache coherency functions. Storing such administrative data in the internal cache is disadvantageous because it increases the area of the internal cache when the agent is manufactured as an integrated circuit. The increased size of the internal cache translates into increased cost of the agent and increased power consumption of the internal cache.

Accordingly, there is a need in the art for an agent that possesses an internal cache with minimal area. There is a need in the art for such an agent that reduces the amount of administrative data stored in association with data from external memory.

SUMMARY

Embodiments of the present invention provide a processing agent for use in a system that transfers data of a predetermined data line length in external transactions. The agent may include an internal cache having a plurality of cache entries. Each cache entry may store multiple data line lengths of data.

DETAILED DESCRIPTION

The present invention, in an embodiment, provides an internal cache in an agent having cache entries whose lengths are a multiple of the length of a data line. One address is stored for the multiple data lines thereby decreasing the area of the cache when the agent is manufactured as an integrated circuit. This is an improvement over traditional internal caches where address information is stored individually for each stored data line. The internal cache may be associated with an improved transaction queue system in which address information similarly is conserved.

Figure 1:
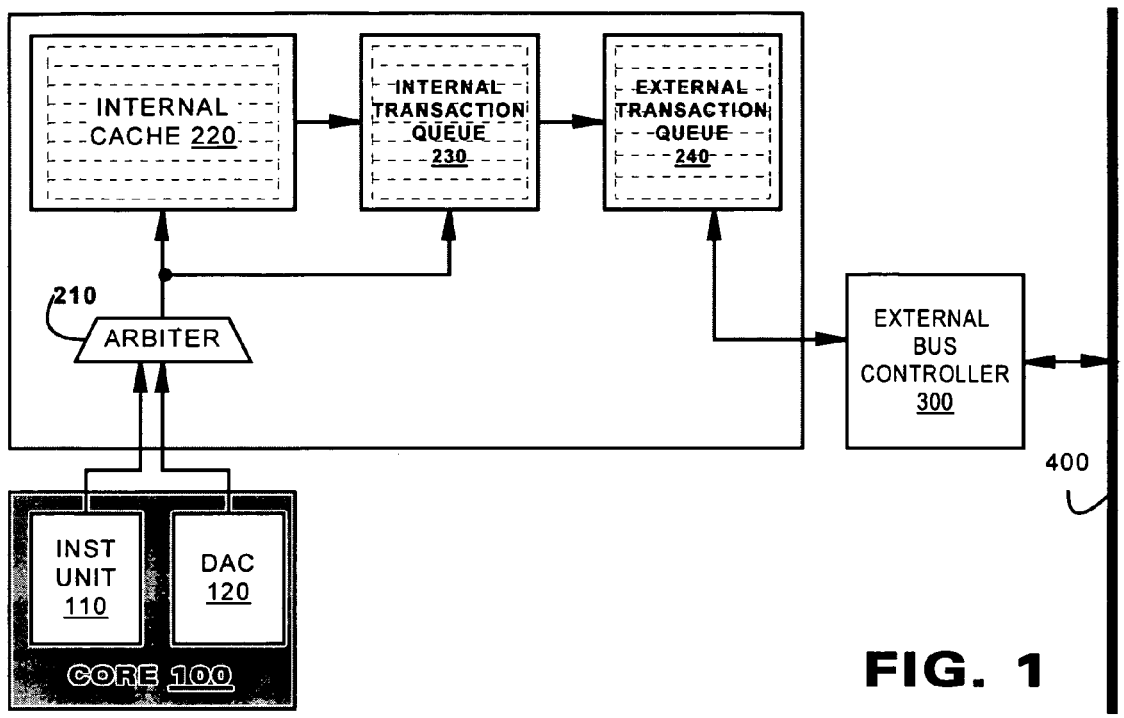
FIG. 1 is a block diagram illustrating a bus sequencing unit of an agent constructed in accordance with an embodiment of the present invention.

In an embodiment, the principles of the present invention may be applied in a bus sequencing unit 200 ("BSU") of an agent, shown in FIG. 1. The BSU 200 includes an arbiter 210, an internal cache 220, an internal transaction queue 230 and an external transaction queue 240. The BSU 200 fulfills data requests issued by, for example, an agent core 100. An external bus controller 300 interfaces the BSU 200 to the external bus 400.

The arbiter 210 receives data request signals from not only the core 100 but also from a variety of other sources (not shown). Of the possibly several data requests received simultaneously by the arbiter 210, the arbiter 210 selects one of them and outputs it to the remainder of the BSU 200.

The internal cache 220 stores data in several cache entries (not shown in FIG. 1). It possesses control logic (also not shown) responsive to a data request to determine whether the internal cache 220 stores a valid copy of requested data. If so, it implements the request. For example, it may read or write data to the cache 220 as determined by a request type signal included in the data request signal.

The internal transaction queue 230 receives and stores data request signals issued by the arbiter 210. It coordinates with the internal cache 220 to determine if the requested data "hits" (was implemented by) the internal cache 220. If a data request "misses" the internal cache 220, the internal transaction queue 230 forwards the data request to the external transaction queue 240.

The external transaction queue 240 interprets data requests and generates external bus transactions to fulfill them. The external transaction queue 240 is populated by several queue entries. The external transaction queue 240 manages the agent's external bus transactions as they progress on the external bus 400. For example, when data is available in response to a read transaction, the external transaction queue 240 retrieves the data and forwards it to, for example, the core 100.

In an embodiment, the internal and external transaction queues 230, 240 may be replaced by a single transaction queue (not shown). In this embodiment, new requests are loaded into the transaction queue. If the request hits the cache 220 the requests are removed from the queue.

The external bus controller 300 drives signals on the external bus 400 as commanded by the external transaction queue 240. During a single bus transaction, a predetermined length of data may be read to/from the agent via the external bus 400.

Figure 2:
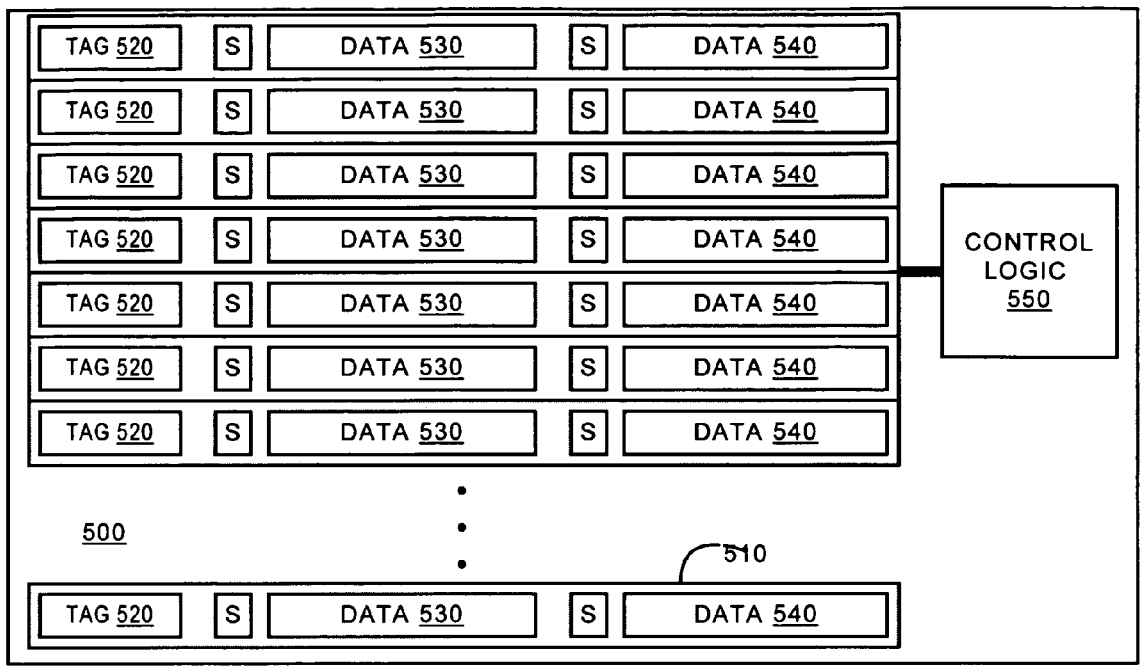
FIG. 2 is a block diagram illustrating an internal cache constructed in accordance with an embodiment of the present invention.

FIG. 2 illustrates a cache 500 constructed in accordance with an embodiment of the present invention. The cache 500 is appropriate for use as an internal cache 220 (FIG. 1). The cache 500 is populated by a number of cache entries 510. Each cache entry 510 includes a tag portion 520 and multiple data portions 530, 540 for storing copies of data from external memory (not shown). The data portions 530, 540 each store a quantity of data corresponding to a data line. The tag portion 520 stores address information identifying the data stored in the data portions 530 and 540. Cache entries 510 also store other administrative data in association with each data portion 530, 540 such as state information (shown as "S") and error correction codes (not shown). The cache 500 also includes a controller 550 that determines hits and misses as described below.

Embodiments of the present invention sever the relationships between "data line lengths" and "cache line lengths" that exist in agents of the prior art. Typically, in known agents, cache line length are the same as data line lengths. Embodiments of the present invention, by contrast, possess cache line lengths that are multiple data line lengths. Data from a single bus transaction would only partially fill a cache entry 510 of the internal cache 500.

Although each cache entry 510 stores multiple data lines, it includes only a single tag portion 520. The tag portion 520 identifies the address of the data stored in the data portions 530, 540. Data in adjacent data portions 530, 540 of a single cache line 510 are retrieved from adjacent locations in external memory (not shown). Thus, the number of tags 520 included in the cache 500 is reduced over traditional caches. The internal cache 500 may be comparatively smaller than known caches when manufactured as an integrated circuit.

The cache 500 may be an associative cache or a set associative cache.

Figure 3:
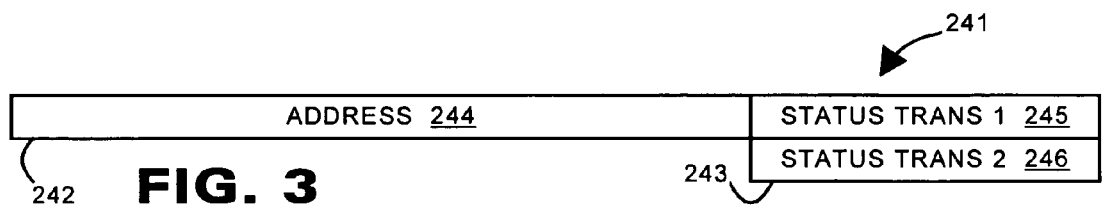
FIG. 3 is a block diagram of a queue entry of an external transaction queue constructed in accordance with an embodiment of the present invention.

FIG. 3 illustrates an entry 241 of an external queue 240 constructed according to an embodiment of the present invention. The queue entry 241 includes a primary entry 242 and a secondary entry 243. The primary entry 242 stores data related to a first bus transaction. It may include the address of the transaction, stored in an address field 244, and status information for the transaction, stored in a status field 245. Status information includes information regarding, for example, the request type, and the stage of the transaction (i.e. whether the transaction has been posted on the external bus 400 and the phase of the transaction). It may include data to be written externally pursuant to a write transaction. The status information also may indicate whether the first transaction is part of a multiple transaction sequence.

The secondary entry 243 stores status information related to a second bus transaction. In an embodiment, the secondary entry 243 includes only a status field 246 for the second transaction. The status field 246, like field 245, may store information regarding, for example, the request type and the stage of the transaction. The queue entry 241 may include as many secondary entries 243 as are necessary for the total number of entries (the one primary entry 242 and multiple secondary entries 243) to equal the number of data portions 530, 540 in the internal cache 220. In an embodiment, the primary-secondary structure of queue entries 241 may be repeated for every queue entry in the external transaction queue 240.

Using the primary-secondary queue entry structure of FIG. 3, the external transaction queue 240 either may post multiple transactions to fill an entire cache entry 510 (FIG. 2) or may post a single transaction to obtain a single data portion 530 or 540. A request cycle of the internal transaction queue 240 cycles through queue entries 241. When the request cycle reaches a queue entry 241, control logic (not shown) examines the status field 245 of the primary entry 242, interprets the request and posts a transaction therefor. When the status field 245 indicates that the request is part of a multiple transaction sequence, the external transaction queue 240 interprets status information in status field 243, increments the address stored in field 242 to address a next data line and posts a second transaction therefor.

Optionally, a request type may be omitted from field 246 in the secondary entry 243. The request type typically is identical for all transactions stored in a single queue entry 241.

If, after a transaction is posted for the primary entry, the status field 245 indicates that the request is not part of the multiple transaction sequence, the request cycle advances to another entry 241 of the external transaction queue 240.

Figure 4:
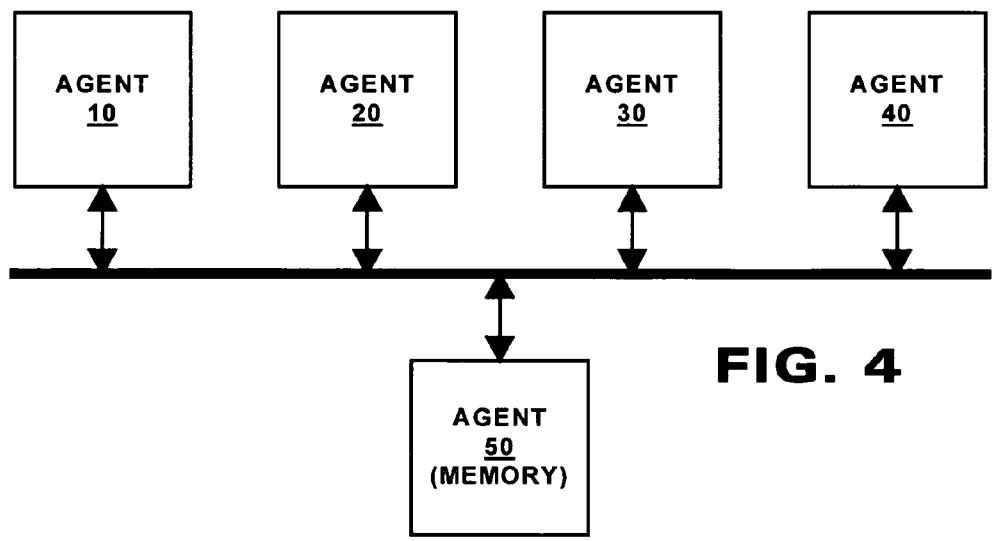
FIG. 4 is a block diagram of a known multiple-agent processing system.

FIG. 4 illustrates a multiple agent system constructed in accordance with an embodiment of the present invention. The agents 10-50 communicate with one another over the external bus 400. One of the agents 50 typically is a memory. The remaining agents 10-40 may share copies of the same data.

Traditionally, in multiple agent systems, cache coherency rules are established to ensure that when an agent uses data, it uses the most current copy of the data that is present in the system. For example, the Pentium® Pro processor operates according to the MESI cache coherency scheme in which copies of data stored in an agent 10-40 are assigned one of four cache coherency states:

Invalid state indicates that a copy of data is not available to the agent,

Shared state indicates that the copy of data possesses the same value as is held in external memory; copies of data in shared state may also be stored by other agents.

Exclusive state indicates that the agent is the only agent in the system (except a memory agent) that possesses a valid copy of the requested data.

Modified state indicates that the agent is the only agent in the system (except a memory agent) that possesses a valid copy of the requested data and the agent possesses a copy that is more current than the copy stored in external memory.

An agent determines what it may do with a copy of data based upon the state. For example, an agent cannot modify data in invalid or shared state without first posting an external bus transaction to acquire exclusive ownership of the data. Other processing systems may behave according to other cache coherency states. In the cache 500 of FIG. 2, state information may be stored in association with each data portion 530, 540 of a cache line (shown as "S").

Data states may change on a data line basis. Consider, for example, an example where an entire cache line 510 is stored with data in shared state. According to the MESI protocol, an agent 10 that stores data in shared state may read the data but may not modify the data without first obtaining ownership through an external bus transaction. Thereafter, another agent 20 may post an external bus transaction to obtain ownership of a data line stored in the cache entry 510 (stored in data portion 540). By protocol, the agent 10 marks its copy of the data as invalid. To implement this step, the agent changes the state of the data portion 540 to indicate that the data is invalid. Valid data remains in the other data portions 530 of the cache entry 510. Thus, although an agent 10 may fill cache entries 510 entirely with data, each data portion 530, 540 of the cache entry 510 need not necessarily change state in unison.

As noted with respect to FIG. 1, an internal cache 220 includes a controller 550 to determine whether a data request hits the cache. The cache 500 of FIG. 2 identifies two types of "hits:" a "cache" hit and a "tag" hit. A cache hit indicates that the cache 500 stores the requested data in cache coherency state that is valid for the request type of the data request. When a cache hit occurs, the controller 550 causes the data request to be executed on the corresponding data portion of the cache entry 510. A tag hit indicates that the address of the new data request matches a tag stored in one of the cache entries 510, but that the cache entry does not store the requested data in a valid cache coherency state.

Figure 5:
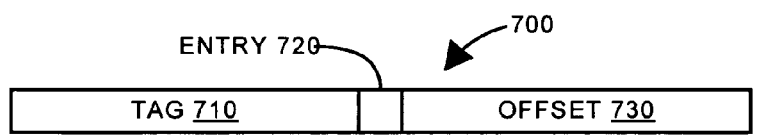
FIG. 5 is a block diagram of fields that may be present in a memory address according to an embodiment of the present invention.

According to an embodiment of the invention, an external memory address may be populated by fields, shown in FIG. 5. The fields may include a tag field 710, an entry field 720 and an offset field 730. The tag field 710 may be used to determine whether a data request causes a cache hit, a tag hit or misses the cache 500 of FIG. 2.

When a data request is loaded into the cache 500, the controller 550 retrieves the tag field 710 from an address included in the data request. The controller 550 determines whether the tag field 710 matches data stored in any of the tag portions 520 of the cache entries 510. In an embodiment, the tag portions 520 are provided with match detection logic (not shown). The controller 550 forwards the tag field 710 to the match detection logic and detects a match signal therefrom. A tag match occurs when the tag field 710 matches data stored in one of the tag portions 720.

The entry field 720 identifies a specific area of the data portions 530, 540 of a matching cache entry. When a tag match occurs, the controller 550 reads the state information from the selected data portions (say 540). Based upon the request type of data request, the controller 550 determines whether the state of the data is valid for the data request. If so, a cache hit occurs.

Figure 6:
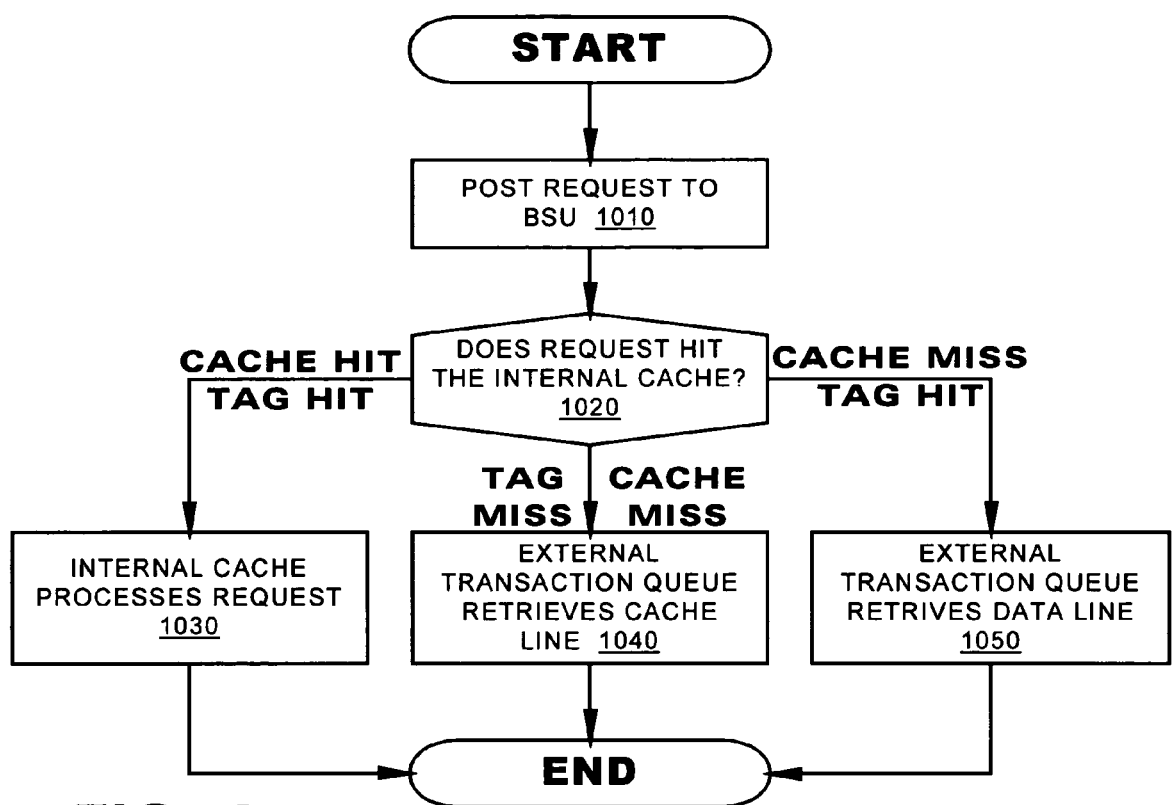
FIG. 6 is a flow diagram of a method of an embodiment of the present invention.

In an embodiment, the BSU 200 operates according to the method of FIG. 6. A data request is posted to the BSU 200 (step 1010). The internal cache 220 determines whether the request hit the cache 220 (step 1020). If the request generates a cache hit, the internal cache implements the data request (step 1030). If the request generates a tag hit only, the external transaction queue 240 retrieves a data line (step 1040). If the request generates a cache miss and tag miss, the external transaction queue 240 retrieves a cache line (step 1050).

Accordingly, the present invention provides an internal cache and a transaction queue system for an agent having reduced area over known agents.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A processing agent to transfer data of a predetermined data line length in an external transaction, the agent comprising:
   an internal cache having a plurality of cache lines, each cache line sized to store a memory address and multiple data line lengths of data; and
   a transaction queue having a plurality of queue entries, the queue entries each further comprising:
      a primary sub entry including an address portion and status portion, the status portion provided for a first external transaction corresponding to a first data portion of a respective cache line, and
      at least a secondary sub entry including a status portion provided for a second external transaction corresponding to a second data portion of the respective cache line, wherein the first and second data portions each stores a quantity of data corresponding to a data line.

2. The processing agent of claim 1, wherein the cache lines each include a tag portion to store the memory address information.

3. The processing agent of claim 2, wherein the internal cache further comprises
   match detection logic for the tag portion, and
   control logic provided in communication with the match detection logic.

4. The processing agent of claim 1, wherein the cache lines each include a cache coherency state field in association with each data line length of data.

5. The agent of claim 1, wherein the status portion of the primary sub entry includes a field representing whether the first external transaction is part of a multiple transaction sequence.

6. The agent of claim 5, wherein when the first external transaction is part of a multiple transaction sequence, the second external transaction is a next transaction of the multiple transaction sequence.

7. The transaction queue of claim 6, wherein the second external transaction addresses a second address adjacent to a first address stored in the address portion.

8. The transaction queue of claim 7, wherein the second address is the first address incremented by one.

9. The agent of claim 1, wherein a total number of primary and secondary entries of the respective cache line equals a multiple number of data line lengths provided in the respective cache line.

10. A processing agent, comprising:
    an internal cache having cache lines each sized to store a memory address and multiple data lines; and
    a transaction queue system comprising a plurality of queue entries, each queue entry to provide a sequence of external transactions, each external transaction of the sequence related to a single data line, the sequence of external transactions related to a single cache line,
    wherein the internal cache and the transaction queue system each receive data requests on a common input.

11. The processing agent of claim 10, wherein the internal cache and the transaction queue system communicate by signal lines.

12. The processing agent of claim 11, wherein the signal lines include a cache hit signal line and a tag hit signal line.

13. The processing agent of claim 10, wherein each queue entry comprising:
    a primary entry including an address portion and status portion, the status portion provided for a first external transaction of the agent, and
    a secondary entry including a status portion provided for a second external transaction.

14. The transaction queue of claim 13, wherein the status portion of the primary entry includes a field representing whether the first transaction is part of a multiple transaction sequence.

15. The transaction queue of claim 13, further comprising control logic adapted to cycle through the queue entries and post transactions therefrom.

* * * * *